March 24, 1964     C. E. REYNOLDS     3,125,794
MANUFACTURE OF PELLETS FROM A CAST STRIP
Filed Oct. 3, 1962
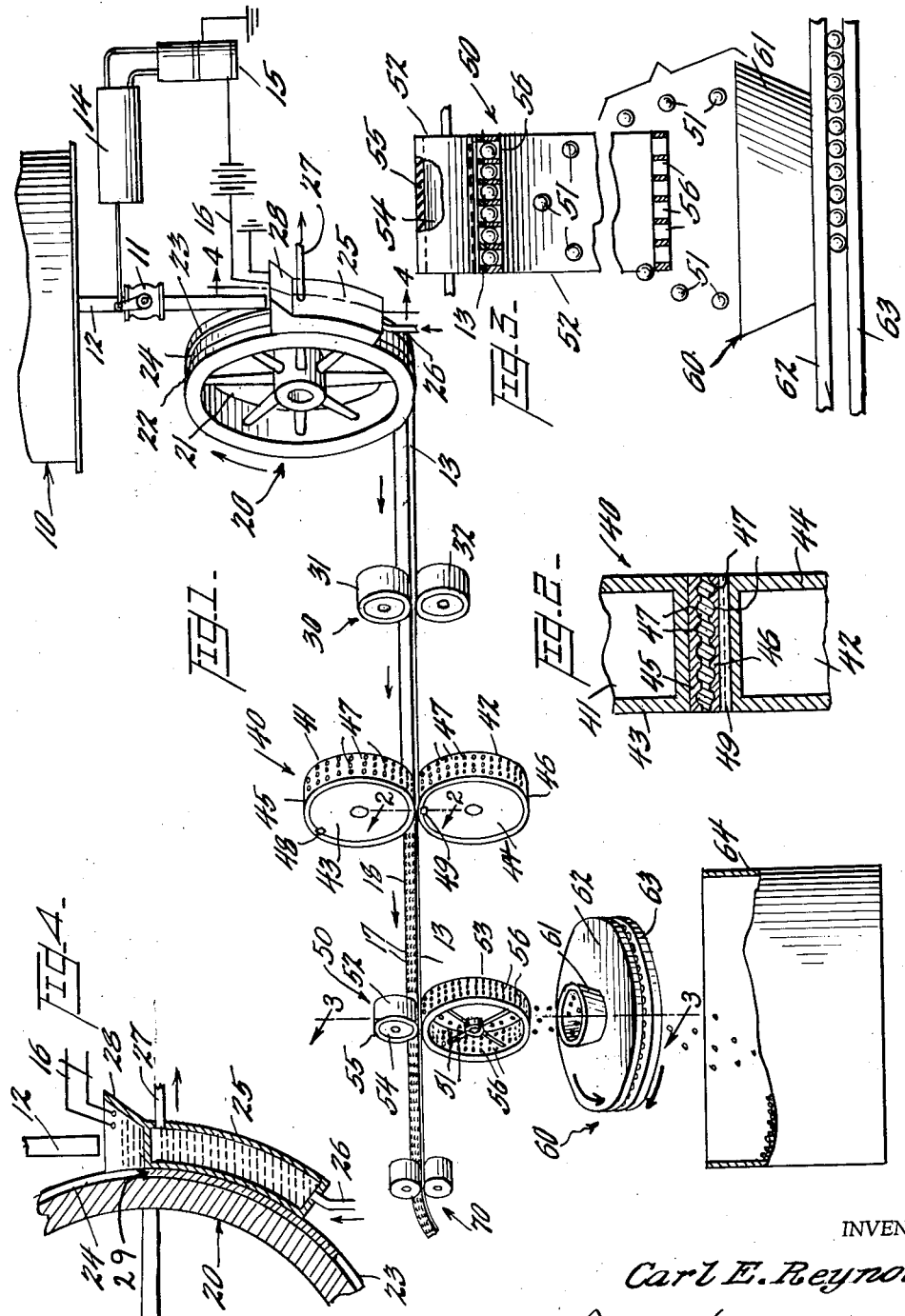
INVENTOR
Carl E. Reynolds,
BY Paris, Haskell & Levine
ATTORNEYS

United States Patent Office 3,125,794
Patented Mar. 24, 1964

---

3,125,794
MANUFACTURE OF PELLETS FROM A CAST STRIP
Carl E. Reynolds, St. Petersburg, Fla., assignor to Florida Fishing Tackle Mfg. Co., Inc., a corporation of Florida
Filed Oct. 3, 1962, Ser. No. 228,173
3 Claims. (Cl. 29—1.22)

The present invention relates to the production of shot or pellets, and particularly, although not necessarily, to spherical pellets. Although it is contemplated that the present invention will find its greatest utility in the manufacture of lead shot, it is not limited to this material, and other metals and materials, such as suitable plastics and the like, can be utilized in the formation of pellets by the teachings of the present invention.

In accordance with the present invention, the pellets or shot are formed from a ribbon of the selected material. The ribbon may be preformed, or it may be continuously cast and formed as an integral step in the procedures of the present invention. In either event, the ribbon is fed through the nip of a pair of molding die rolls whose surfaces are formed with matching cavities which may be hemispherically or otherwise shaped, as desired. The ribbon is compressed between these rolls with sufficient pressure to cause the material of the ribbon to flow into the roll surface cavities, thereby forming sets of paired protuberances shaped in accordance with the roll cavities, with one set of protuberances projecting from one surface of the ribbon, and the other set of protuberances projecting from the opposite surface of the ribbon. All the protuberances remain united by means of a residual thin web of the original ribbon. This web is then passed through the nip of a pair of expressing rolls, where the paired pellet-like protuberances are pushed or pressed out of the retaining web as pellets or shot. In the case of spherical pellets, if desired the pellets may be worked into true spheres and the flashings and other irregularities removed by passing the pellets between the surfaces of a pair of oppositely rotating discs.

It is accordingly one object of the present invention to provide for the manufacture of pellets or shot.

Another object of the present invention is to provide for the continuous production of pellets by molding the pellets from a ribbon.

Another object of the present invention is to provide for the continuous production of pellets by continuously casting a ribbon of material, and molding the pellets from the ribbon.

Still another object of the present invention is to provide for the continuous casting of a ribbon of material.

Other objects and advantages of the present invention will become apparent to those skilled in the art from a consideration of the following detailed description of one exemplary embodiment thereof, had in conjunction with accompanying drawings, in which like reference characters refer to like or corresponding parts, and wherein:

FIG. 1 is a schematic diagram illustrating an apparatus for practicing the present invention; and FIG. 2 is an enlarged sectional view taken along the line 2—2 of FIG. 1;

FIG. 3 is an enlarged sectional view taken along the line 3—3 of FIG. 1; and

FIG. 4 is an enlarged and fragmentary detailed cross-sectional showing of the ribbon casting apparatus, taken along the line 4—4 of FIG. 1.

Referring to FIG. 1, the material of which the pellets or shot are to be made, may be lead, and in that case a supply of molten lead is provided in a melting pot 10. The molten lead is fed from the pot 10 to the continuous ribbon casting apparatus 20. The lead ribbon 13 thus formed is drawn from the casting apparatus by compressing rolls 31 and 32 at sizing station 30 and there pressed to a desired thickness. The uniformly sized ribbon of lead is then fed into the nip of a pair of molding rolls 41 and 42 at the molding station 40, where the shot or pellets are molded as paired protuberances (shown as hemispherical) still united by a residual web of lead. At 50 the balls or pellets are pressed out of the web, collected between the oppositely rotating plates 62 and 63 at the spherical truing station 60, and thence fed to a collecting hopper 64. Meanwhile the residual web of lead issuing from the pellet expressing station 50 is collected by the scrap take up rolls 70.

Considering the apparatus of FIG. 1 in greater detail, reference is first had to the continuous ribbon casting apparatus 20, which is also partially shown in greater detail in FIG. 4. Casting apparatus 20 comprises a rotating wheel 21 having two peripheral circumferential flanges 22 and 23 which are axially spaced from each other, defining therebetween a continuous peripheral channel 24. A stationary shoe 25 is positioned in sliding engagement with the rim flanges 22 and 23 to define therewith and with channel 24 a confined mold cavity 29 of desired dimensions. The shoe 25 is hollow and is water cooled internally by the flow of cooling water into the shoe at 26 and out at 27. The top of the shoe is funneled at 28 to direct the flow of molten lead into the top of the casting cavity 29.

Thus molten lead is caused to flow from pot 10 under control of valve 11 through pipe 12 into the funnel 28 of shoe 25. This molten lead is directed into the mold cavity 29, and as wheel 21 rotates, the molten lead in cavity 29 is chilled and solidified by the water cooling of shoe 25, and issues at the bottom of the mold cavity as a solidified ribbon of lead 13. So long as the wheel 21 is rotated at the proper speed to permit solidification of the lead in the mold cavity 29, and the feed of molten lead is regulated therewith to maintain the mold cavity 29 filled with lead, a continuous ribbon of lead can be stripped from channel 24 at the bottom of wheel 21.

Molten lead can be maintained in proper supply in funnel 28, by means of valve 11, which may be automatically controlled. As shown in FIG. 1, this automatic control may be effected by an air piston motor 14 for operating the valve 11, and an electric solenoid valve 15 for controlling the feed of compressed air to, and exhaust of the piston motor 14, as will be fully understood by those skilled in the art. Conveniently, operation of the solenoid can be controlled by an electric circuit completed through the pool of lead in funnel 28. Thus, when the level of lead in funnel 28 is high enough to reach wire 16, the solenoid circuit is completed through the lead to energize the soleniod 15, and thereby shut valve 11. When the level of lead in funnel 28 falls below the level at which the end of wire 16 is positioned, the circuit of solenoid 15 is opened, thereby deenergizing the solenoid to effect an opening of valve 11, as might be effected by a spring return operating on the piston of air motor 14.

The continuous lead ribbon thus issuing from casting station 20 is fed into the nip of two steel sizing rolls 31 and 32. The spacing between these rolls may be adjusted to obtain a desired uniform thickness of ribbon 13 issuing therefrom and feeding to pellet molding rolls 41 and 42.

Rolls 41 and 42 are identical. They comprise central cores 43 and 44, and peripheral molding sleeves 45 and 46. Each of the molding sleeves is formed with a regular pattern of hemispherical (or other desired shape) cavities 47 which mold the pellets. Sleeves 45 and 46 are removable in order to permit sleeves having different sized or shaped cavities 47 to be installed, for the molding of different sizes or shapes of pellets. Sleeve 45 is keyed at 48 to its roll core 43, and sleeve 46 is keyed at 49 to its roll core 44. These keys 48 and 49 function to locate the two sleeves 45 and 46 in precise relative angular relation to their cores and to each other in order that at the nip of the two rolls 41 and 42 a set of cavities 47 in sleeve 46 is precisely opposed to a corresponding set of cavities 47 in sleeve 45.

Thus, with rolls 41 and 42 set closer together than sizing rolls 31 and 32, as the ribbon 13 passes between the molding rolls 41 and 42, the compression of the ribbon by these rolls causes the lead to flow into the cavities 47 of each roll. Therefore, as ribbon 13 issues from the molding rolls it has a set of protruding hemispheres 17 formed on the upper surface, and a corresponding set of protruding hemispheres formed on the bottom surface, all joined together by a thin web of lead 18. In view of the registry of the two sets of cavities 47, each hemisphere molded on the upper surface of web 18 is paired with a similar hemisphere molded on the under side of web 18, with these two hemispheres located exactly opposite one another, and together forming a spherical pellet.

Ribbon 13, thus molded into protruding hemispheres connected by thin web 18, is passed to the pellet expressing station 50, where the protuberances 17 and their mating protuberances on the opposite side of web 13 are pressed out of the web to form the pellets 51. Pellet expressing station 50 comprises two rolls 52 and 53, between which the ribbon 13 is fed. Roll 52 comprises a steel backing core 54 having a covering blanket of rubber 55 vulcanized to the surface thereof. Roll 53 is formed with a number of perforations 56 arranged in a pattern corresponding in size, shape, and orientation to the cavities 47 on rolls 41 and 42. Roll 53 is made interchangeable with other perforated rolls to correspond with the particular sleeves 45 and 46 selected for rolls 41 and 42.

As the web 18 issuing from the molding station 40 is fed into the nip of rolls 52 and 53, the protuberances or hemispheres projecting from the lower surface of web 18 enter the perforations 56, while roll 52 applies a cushioned pressure to the upper surface protuberances 17. As a result, the paired protuberances or hemispheres are pressed out of the web 18, without serious deformation, as pellets 51, and as they fall from the web they are collected in funnel 61 of the truing station 60. Meanwhile the residual web 18 is fed to the scrap take-up rolls 70 and collected for reuse in the lead melting pot 10.

The truing station 60 is applicable particularly to the formation of truly spherical pellets. It comprises a pair of juxtaposed oppositely rotating disks 62 and 63 which are spaced apart axially by the exact diameter desired for pellets 51. The spacing between disks 62 and 63 is made adjustable to accommodate for different sized pellets formed by the selected molding sleeves 45 and 46 chosen for rolls 41 and 42. As the pellets 51 fall from the web 18, they are collected by funnel 61 and there introduced into the space between disks 62 and 63 about at the center thereof. As pellets 51 enter between the disks they are rotated or rolled over and over as they work their way toward the periphery of the truing disks. During this rolling process, any flashings on the pellets 51 are removed, and they are formed into substantially true spheres. The spherical pellets issuing from the periphery of disks 62 and 63 are collected in a hopper 64.

It is apparent that wheel 20, rolls 31 and 32, rolls 41 and 42, rolls 52 and 53, and rolls 70 are all driven in timed relation, preferably by a single gear train or gearchain arrangement, operated by one motor, in order that all operations be carried out in synchronism and the rate of feed of ribbon 13 be controlled at all stages to prevent an excess accumulation or stretching of the ribbon between stations. It is also apparent that a structural base for the apparatus is provided, as well as rotation axles for the rolls and mounting structure for all the parts. However, since all these structural elements are conventional, are not per se part of the present invention, and would be design features readily apparent to those skilled in the art, they are not illustrated in the present drawings, as they would serve only to confuse rather than to clarify the present invention.

Although herein specifically described in relation to the manufacture of spherical lead pellets or shot, it is apparent that the present method and apparatus and parts thereof are applicable to the manufacture of pellets from other malleable materials, such as other metals and suitable plastics. It is further apparent that the invention is applicable to the formation of non-spherical pellets. Accordingly, since numerous variations, modifications and changes in the herein described specific embodiment will be apparent to those skilled in the art, it is not intended that the present invention be construed as restricted to this embodiment; but such variations, changes and modifications as are embraced by the spirit and scope of the appended claims are contemplated as within the purview of the present invention.

What is claimed is:

1. An apparatus for forming pellets, comprising: a supply container; means for casting a flat ribbon including a rotatably mounted wheel having a peripheral circumferential rectangular channel, a stationary shoe fitted over a portion of the circumferential periphery of said wheel in sliding engagement therewith to form a casting cavity between said shoe and said channel, and means for cooling said shoe; means for conducting a flow of molten material from said supply container to said cavity, and means for controlling the rate of flow of said molten material; said molten material being solidified in said cavity by said cooling means, and rotation of said wheel causing the issuance of a continuous flat ribbon of said material from said cavity; means for sizing said ribbon into a desired uniform thickness, including a pair of pressure rolls between which said ribbon is passed; means for molding pellets from said ribbon, including a pair of compression molding rolls between which the sized ribbon is passed, said molding rolls having cavities formed over the periphery thereof, whereby said ribbon is compressed therebetween causing the ribbon material to flow into said cavities to produce a plurality of molded protuberances projecting from the surface of said ribbon; and means for pressing said molded protuberances from said ribbon, including a pair of pressure rolls between which the molded ribbon is passed, one of said pressure rolls having a plurality of perforations of a size to correspond approximately with said protuberances, the other of said pressure rolls having a continuous cushioned surface, whereby said molded protuberances are pushed by said other pressure roll from said ribbon and through the perforations in said one pressure roll to form pellets from said ribbon.

2. An apparatus for forming pellets as set forth in claim 1, and further including means for truing said pellets into substantially spherical shape and removing flashings therefrom, comprising a pair of juxtaposed oppositely rotating disks axially spaced apart a distance equal to the diameter desired for said pellets, and means for introducing said pellets pressed from said ribbon between said disks near the centers thereof, whereby said pellets are rotated over and over between said disks and issue from the periphery of said disks as substantially true spheres.

3. An apparatus for forming pellets from a moldable material in ribbon form comprising, a pair of compression molding rolls between which the ribbon is passed, said molding rolls having cavities formed over the periphery thereof, whereby said ribbon is compressed therebetween causing the ribbon material to flow into said cavities to produce a plurality of molded pellet-like protuberances in said ribbon, and a pair of pressure rolls between which the molded ribbon is passed, one of said pressure rolls having a plurality of perforations of a size to correspond approximately with said pellet-like protuberances, the other of said pressure rolls having a continuous cushioned surface, whereby said pellet-like protuberances are pressed out of said ribbon by said other pressure roll and through said perforations to form pellets.

References Cited in the file of this patent

UNITED STATES PATENTS

| | | |
|---|---|---|
| 358,984 | Quackenbush | Mar. 8, 1887 |
| 767,831 | Pearson et al. | Aug. 16, 1904 |
| 1,674,112 | Hering | June 19, 1928 |
| 2,206,930 | Webster | July 9, 1940 |
| 2,327,894 | Hodgson | Aug. 24, 1943 |
| 2,682,691 | Harter | July 6, 1954 |
| 2,782,487 | Properzi | Feb. 26, 1957 |
| 2,931,082 | Brennan | Apr. 5, 1960 |